(12) United States Patent
Snyder

(10) Patent No.: US 10,724,450 B2
(45) Date of Patent: Jul. 28, 2020

(54) ENHANCED PRESSURE WAVE SUPERCHARGER SYSTEM AND METHOD THEREOF

(71) Applicant: Aerodyn Combustion LLC, Indianapolis, IN (US)

(72) Inventor: Philip H. Snyder, Avon, IN (US)

(*) Notice: Subject to any disclaimer, the term of this patent is extended or adjusted under 35 U.S.C. 154(b) by 148 days.

(21) Appl. No.: 15/653,273

(22) Filed: Jul. 18, 2017

(65) Prior Publication Data
US 2018/0016997 A1    Jan. 18, 2018

Related U.S. Application Data

(60) Provisional application No. 62/363,576, filed on Jul. 18, 2016.

(51) Int. Cl.
| F02D 41/00 | (2006.01) |
| F02B 39/10 | (2006.01) |
| F02B 37/18 | (2006.01) |
| F02C 6/12 | (2006.01) |
| F02B 33/42 | (2006.01) |
| F01N 5/04 | (2006.01) |
| F02C 3/02 | (2006.01) |
| F01C 11/00 | (2006.01) |
| F02B 33/44 | (2006.01) |
| F01N 5/02 | (2006.01) |

(52) U.S. Cl.
CPC ........... *F02D 41/0007* (2013.01); *F01N 5/04* (2013.01); *F02B 33/42* (2013.01); *F02B 37/186* (2013.01); *F02B 39/10* (2013.01); *F02C 3/02* (2013.01); *F02C 6/12* (2013.01); *F01C 11/008* (2013.01); *F01N 5/02* (2013.01); *F02B 33/443* (2013.01); *Y02T 10/144* (2013.01); *Y02T 10/16* (2013.01)

(58) Field of Classification Search
CPC .. F01C 11/008; F01N 5/02; F01N 5/04; F02B 33/42; F02B 33/443; F02B 37/186; F02B 39/10; F02C 3/02; F02C 6/12; F02D 41/0007; Y02T 10/144; Y02T 10/16
See application file for complete search history.

(56) References Cited

U.S. PATENT DOCUMENTS

| 4,488,532 | A | * | 12/1984 | Mayer | F04F 13/00 |
| | | | | | 123/559.2 |
| 4,561,407 | A | * | 12/1985 | Jaussi | F02B 33/42 |
| | | | | | 123/559.2 |
| 4,702,075 | A | * | 10/1987 | Jenny | F01N 3/031 |
| | | | | | 123/559.2 |
| 4,702,218 | A | * | 10/1987 | Yoshioka | F02B 33/42 |
| | | | | | 123/559.2 |

(Continued)

*Primary Examiner* — Jesse S Bogue
(74) *Attorney, Agent, or Firm* — Tyler B. Droste; Gutwein Law

(57) ABSTRACT

An enhanced pressure-wave supercharger for a combustion engine utilizes a superior pressure wave process cycle design. The design utilizes a select final portion of the compressed gas stream exiting the rotor, and supplies it to a subsequent inlet port ahead of and prior to the introduction into the rotor of the aspirated air to be compressed. Work is extracted within the rotor from this gas stream and transferred into rotational energy of the rotor through using a portion the available momentum of the compressed gas via incidence on the rotor webs to turn the rotor by means of conventional turbomachinery principles.

17 Claims, 6 Drawing Sheets

(56) References Cited

U.S. PATENT DOCUMENTS

| | | | | |
|---|---|---|---|---|
| 4,796,595 | A * | 1/1989 | El-Nashar | F04F 13/00 123/559.2 |
| 5,052,362 | A * | 10/1991 | Jenny | F02B 33/42 123/559.2 |
| 5,799,641 | A | 9/1998 | Reatherford | |
| 6,082,341 | A * | 7/2000 | Arai | F02B 33/42 123/559.2 |
| 6,351,934 | B2 | 3/2002 | Snyder | |
| 6,439,209 | B1 * | 8/2002 | Wenger | F01N 3/20 123/559.2 |
| 6,846,208 | B1 | 2/2005 | Goldmeer | |
| 7,555,891 | B2 | 11/2005 | Muller et al. | |
| 7,080,633 | B2 * | 7/2006 | Wenger | F02B 33/42 123/559.2 |
| 7,669,587 | B2 * | 3/2010 | Guzzella | F01N 3/101 123/559.2 |
| RE45,396 | E | 3/2015 | Muller | |
| 2012/0037131 | A1 | 2/2012 | Glitz | |
| 2012/0312282 | A1 | 12/2012 | Glitz | |
| 2013/0037008 | A1 | 7/2013 | Xi | |

* cited by examiner

PRIOR ART

PRIOR ART

ENHANCED PRESSURE WAVE SUPERCHARGER SYSTEM AND METHOD THEREOF

CROSS-REFERENCE TO RELATED APPLICATION

This U.S. patent application claims priority to U.S. Provisional Application No. 62/363,576 filed on Jul. 18, 2016, the disclosure of which is considered part of the disclosure of this application and is hereby incorporated by reference in its entirety.

FIELD OF THE INVENTION

This invention relates generally to internal combustion engines equipped with superchargers for supplying air to the engines according to the requirements of the engines to increase efficiency and performance of the engines. In particular, the invention relates to an apparatus and method for supercharging various types of internal combustion engines.

BACKGROUND

Air displacement devices have been developed and used to increase the supply of air and fuel to internal combustion engines to boost engine horsepower. An example of an air displacement device is the "Roots blower" shown by P. H. Roots in U.S. Pat. No. 30,157 and G. Scheerer in U.S. Pat. No. 2,201,014. Each of these devices has a belt-driven shaft that drives two close-clearance rotors. The rotating rotors during each rotation sweep out a specific volume of air to an air receiver, such as an internal combustion engine. The rotational speed of the rotors largely determines the unthrottled volume of air discharged by the device.

Internal combustion ("IC") engine exhaust gas streams contain significant capability to perform work. The capture of this available work through the use of conventional means to benefit the IC engine in compressing its inlet air stream is often inadequate. Wave-rotor based superchargers, commonly termed Pressure Wave Supercharger ("PWS") of current technology have not met the needs of supercharging of the internal combustion engine in a way superior to that of the conventional turbine type exhaust gas driven turbochargers, or shaft driven screw compressors or Roots blowers.

The existing PWS devices suffer from wave process designs that compromise their ability to compress aspirated air by way of efficiently exchanging work with the hot exhaust stream of the IC engine in a suitably compact unit. There exists a need to provide a supercharger design that better compress the aspirated air to a higher pressure more efficiently and to lower the final temperature in a more controllable way than conventional PWS systems.

BRIEF SUMMARY OF THE INVENTION

In one aspect, this disclosure is related to internal combustion engine supercharger that utilizes a superior pressure wave process cycle design within a pressure wave supercharger of the wave rotor type. The design utilizes a select final portion of the compressed gas stream exiting the rotor, which is the stream produced by the internal interactions within the wave rotor of the aspirated air with the higher temperature IC engine exhaust stream, and supplies it to a subsequent inlet port ahead of and prior to the introduction into the rotor of the aspirated air to be compressed. Work is extracted within the rotor from this gas stream and transferred both into the incoming aspirated air by wave processes and into rotational energy of the rotor by using a portion of the available momentum of the compressed gas via incidence on the rotor webs to turn the rotor by means of conventional turbomachinery principles.

The compressed gas stream transmits a portion of the momentum of the same select final portion of the compressed gas stream to the aspirated air by creation of an expansion wave and by gas to gas contact inside the rotor realizing a superior wave process design. This resulting series of pressure waves and flow processes has a fewer number of end to end pressure waves traveling within the rotor passages. Unfavorable traveling waves within the passages are reduced or eliminated and the designed wave cycle is able to deliver a higher level of work exchange. An optional valve controls the flow of the select final portion of gas. The presence of a variable turning vane in the entry of the select final portion of the compressed gas flow into the rotor is adjusted to set the amount of work transmitted to the rotor at a rotor speed or to control the rotor speed. Additional work may be extracted from the select final portion of the compressed gas by imparting rotational energy to a shaft to accomplish various purposes. This select final portion of the compressed gas stream in termed, Flow Stream B.

Another aspect of the present invention relates to an enhanced pressure-wave supercharger for a combustion engine, comprising at least one housing and a plurality of channels configured to direct gas towards and from said housing, with at least one rotor disposed within said housing. Yet another aspect of the present invention relates to an enhanced pressure-wave supercharger for a combustion engine, wherein the housing comprises a first portion and a second portion, wherein said first portion is configured to generate pressurized gas to be supplied to said engine, wherein the second portion is configured to create rotational energy to turn said rotor.

Yet another aspect of the present invention relates to the supercharger described above further comprising a first channel configured to supply exhaust gas from the combustion engine, a second channel configured to draw in air from an external environment, a third channel configured to discharge exhaust gas from the supercharger, a fourth channel configured to supply a first portion of pressurized gas from the housing to the combustion engine, a fifth channel having a bypass inlet and a bypass outlet passage, wherein the bypass inlet is configured to direct a second portion of pressurized gas from inside said first portion of the housing back into the second portion of the housing through the bypass outlet passage.

Yet another aspect of the present invention relates to the supercharger described above further comprising a fifth channel that further comprises a turbine or other work extracting device. Yet another aspect of the present invention relates to the supercharger wherein the fifth channel further comprises a turning or moveable vane and a control valve, wherein said turbine or work other extracting device is configured to extract work from the second portion of pressurized gas, and wherein the control valve restricts and controls the amount of flow of the second portion of pressurized gas, wherein the vane turns the second portion of pressurized gas as it enters the bypass inlet passage thus adjusting the angle of the flow approaching the rotor and setting the amount of work transmitted to the rotor.

Yet another aspect of the present invention relates to a method of providing compressed gas to an combustion engine using an enhanced pressure wave supercharger by first providing a pressure wave rotor assembly having a rotatable rotor within a plurality of fluid channels for the passage of gas therethrough, compressing air with an enhanced pressure wave supercharger, wherein an exhaust gas channel connects an combustion engine to the pressure-wave supercharger, wherein exhaust gas from the combustion engine is used to power the pressure-wave supercharger, an outlet channel is connected from the pressure-wave supercharger to the engine, an air inlet channel connected to the pressure-wave supercharger, and outlet channel connected to an exhaust system to the pressure wave supercharger, a bypass channel connected to two portions of the enhanced pressure wave supercharger, and a gas inflow valve for increasing and decreasing gas flow through the exhaust gas channel, and creating a compression flow stream and using the bypass channel to more efficiently drive said supercharger.

BRIEF DESCRIPTION OF THE DRAWINGS

The features and advantages of this disclosure, and the manner of attaining them, will be more apparent and better understood by reference to the following descriptions of the disclosed system and process, taken in conjunction with the accompanying drawings, wherein.

DETAILED DESCRIPTION OF THE INVENTION

Figure 1A:
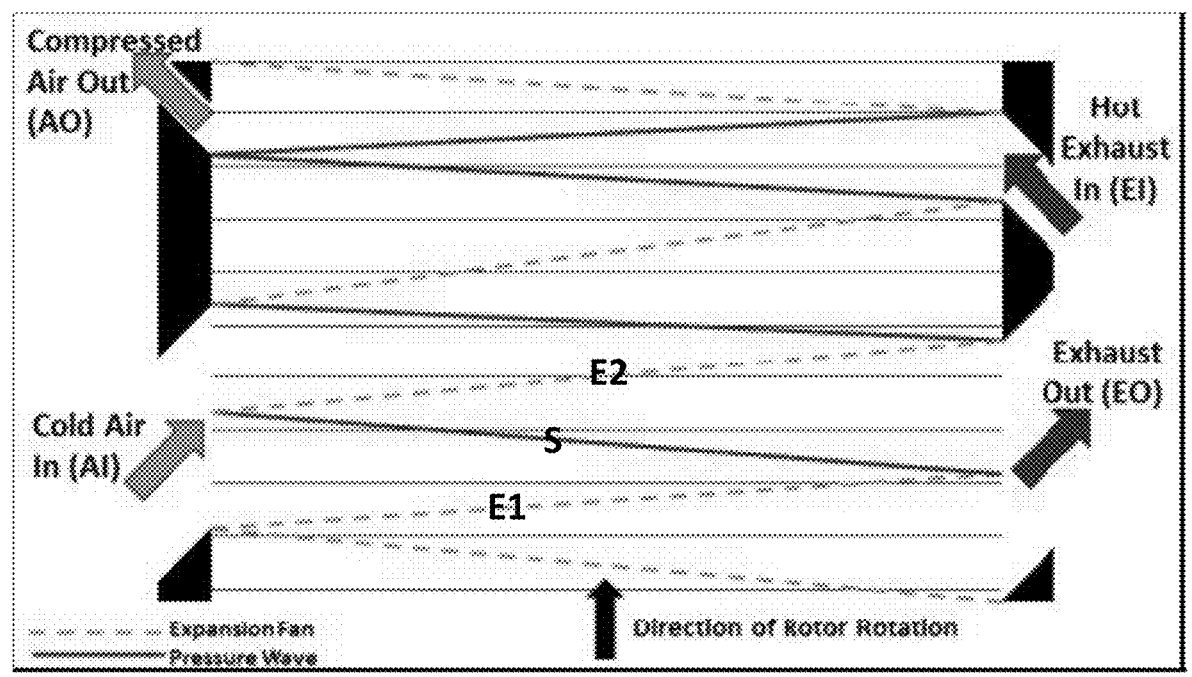
FIG. 1A is an illustration of conventional PWS port and wave primary structures.

Conventional pressure wave supercharger technology is disclosed and represented by the work of Mataczynski, Paxson, Polanka, and Hoke in AIAA paper 2016-0768. In that document, the structure of the conventional device including ports and waves is represented as shown in FIGS. 1A and B. Most notable are the presence of reflected shock wave S and expansion wave E as pointed out in FIGS. 1 and 2 below.

Figure 1B:
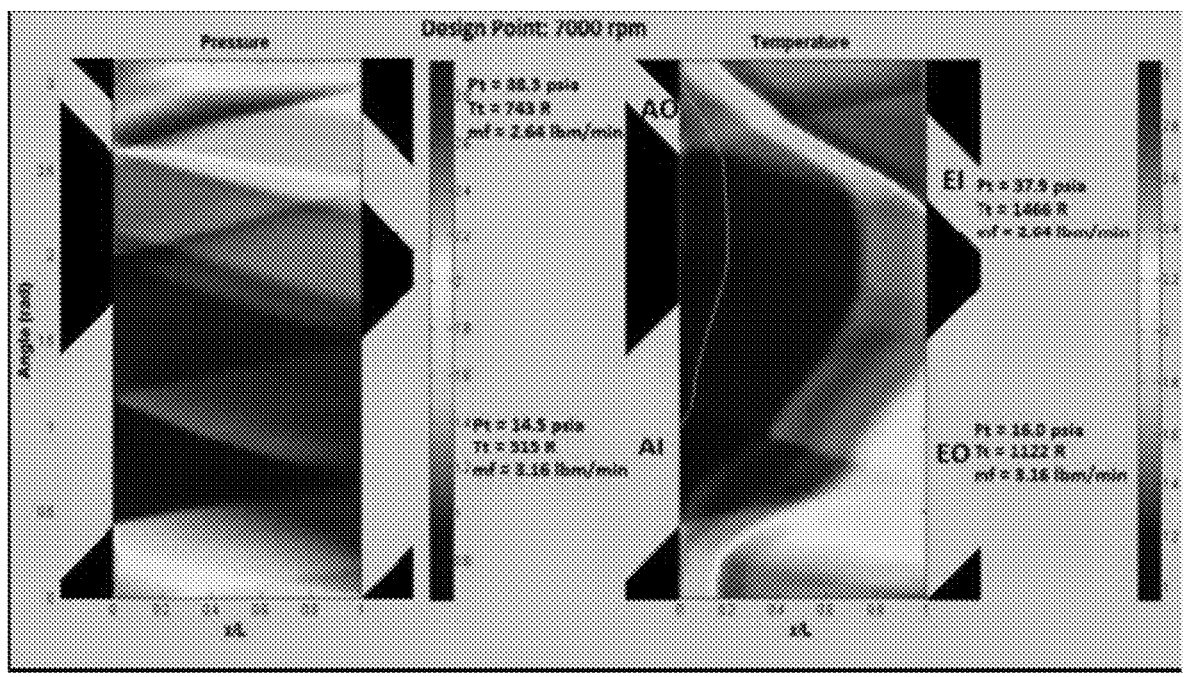
FIG. 1B illustrates the contours of pressure and temperature illustrating wave and gas flows in a conventional PWS systems.
Figure 3:
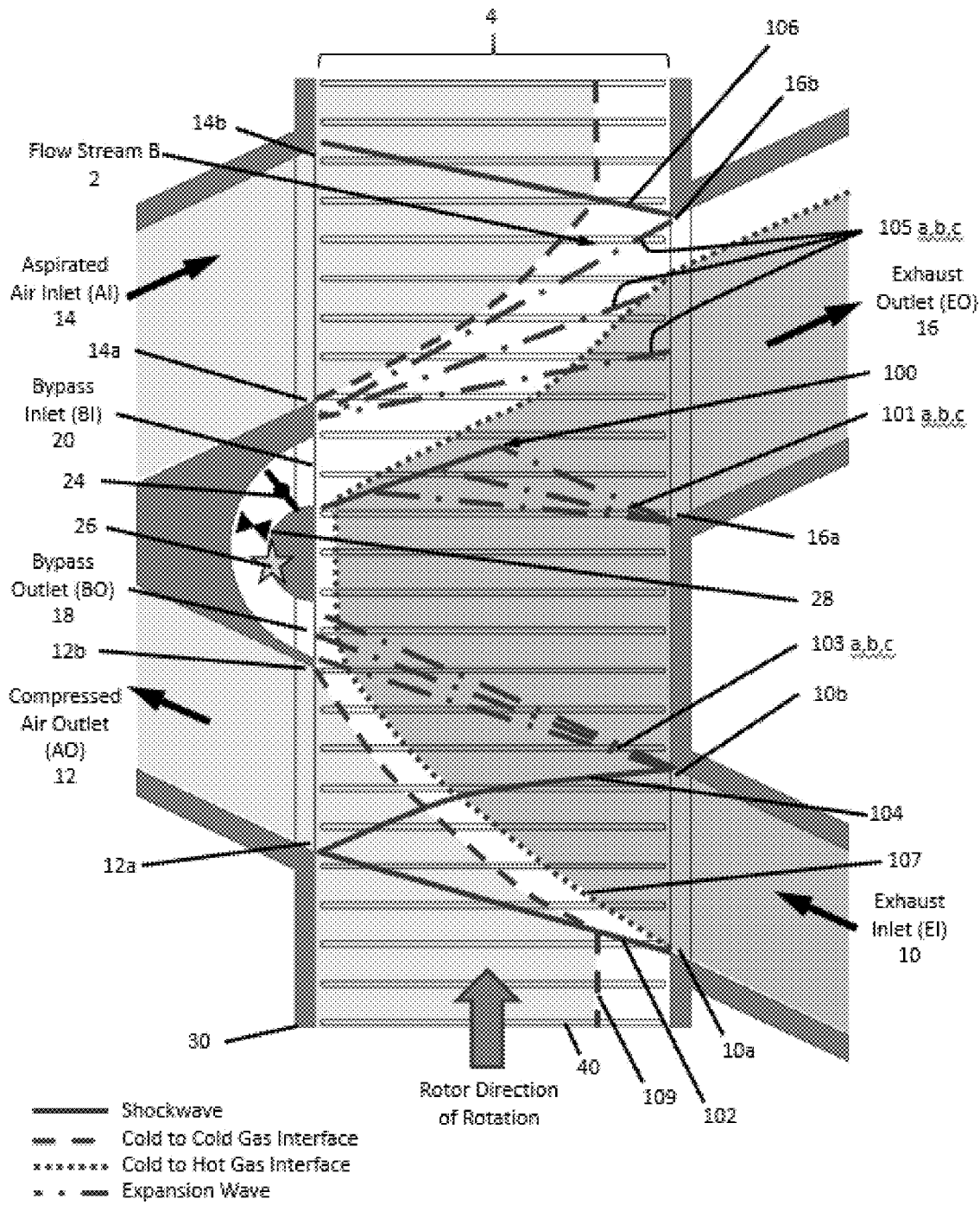
FIG. 3 is a wave diagram of the exemplary embodiment shown in FIGS. 2A-2B and the creation of a secondary flow stream called Flow Stream B.
Figure 4:
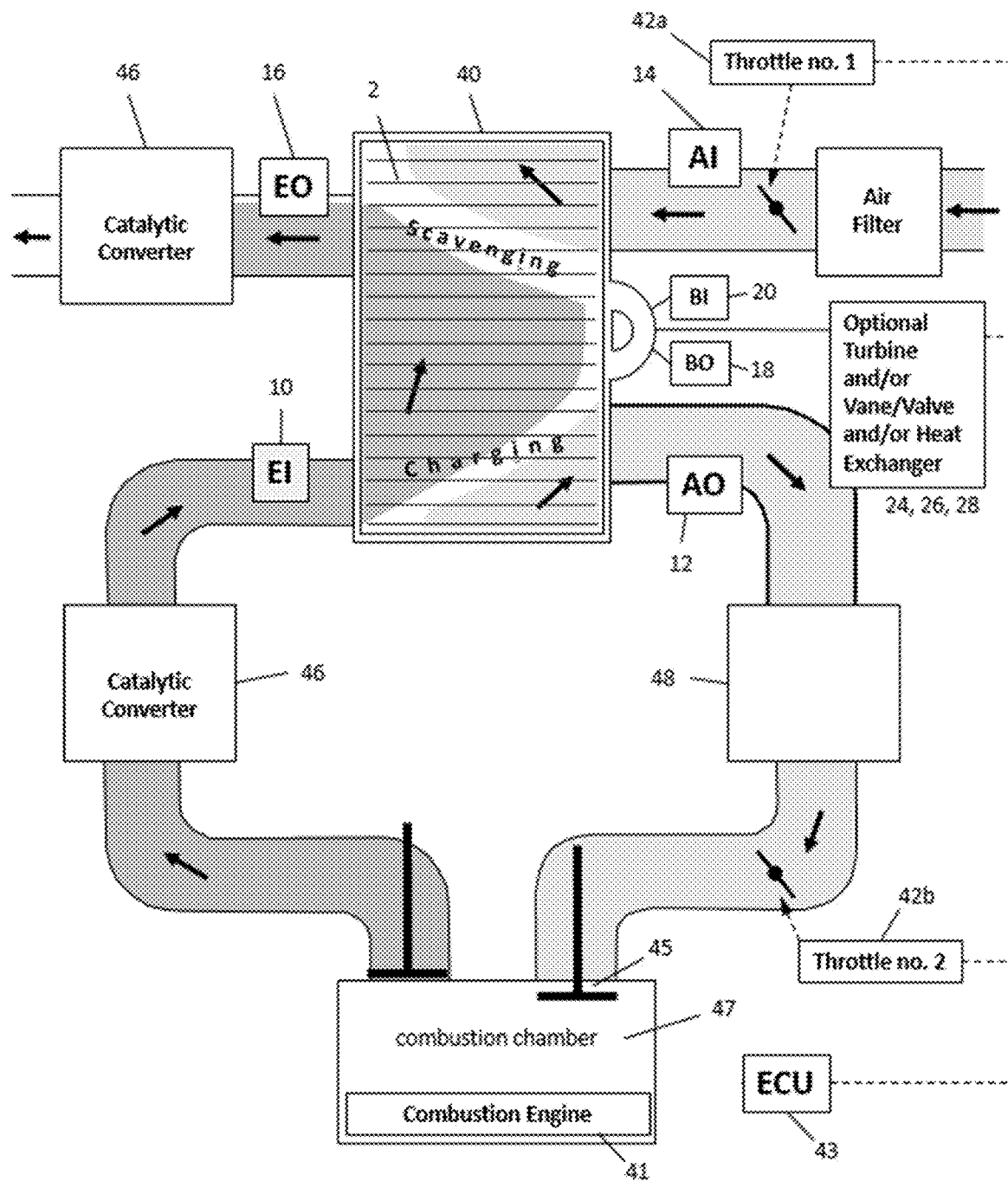
FIG. 4 illustrates an exemplary embodiment of the present invention with a conventional combustion engine system.

As shown in FIG. 1, the presence of reflected waves within an open port caused by shock wave S and expansion waves E1 and E2, can result in strong velocity gradients in the flow within the port. These velocity gradients are of significant consequence in that they generate viscous losses within the port and rotor passage flows. They also reduce the speed at which the incoming gas flow and exiting gas flow can accomplish their exchange within the rotor, thus causing the required extent of the Air Inlet ("AI") and Exhaust Outlet ("EO") ports to be longer in azimuthal extent. The resulting PWS unit is thus required to be larger than in the case of the Enhanced PWS ("EPWS") of the present invention. Additionally, the strength of the shock resulting from the closure of the EO port 16 is reduced relative to the EPWS, resulting in lower compression of the aspirated air. The presence of the Bypass Outlet ("BO") port 18 and Bypass Inlet ("BI") port 20, shown in FIGS. 2A and 3 of the present invention, allows for the creation of a secondary flow stream 2, herein referred to as Flow Stream B and is shown in FIGS. 3 and 4. A duct or passage 22 using any suitable material can connect the BI port 20 and the BO port 18. This Flow Stream B 2 can eliminate the formation of shock wave S and expansion waves E1 and E2 illustrated in FIG. 1. Additionally, the use of the BO port 20 can smooth the velocity within AO port 12 eliminating viscous losses in AO port 12 flow.

A first channel, such as the EI port 10 can provide exhaust gas from a combustion engine to the rotor. A second channel, such as the AI port 14 can draw air into the rotor from an external environment. The air can first pass through a filter before being introduced into the rotor. A third channel, such as the EO port 16 can discharge exhaust gases that are introduced or further created by the rotor from the housing. A fourth channel, such as the AO port can supply a first portion of pressurized gas generated by the rotor to a combustion engine. Gas can travel to and from the EPWS via a plurality of ducting as shown in FIG. 4. A fifth channel, such as the channel 22 created by the BO port 18 and the BI port 20 can provide a passage for directing a second portion of the pressurized gas from inside a first portion of the rotor housing 30 and back into a second portion of the rotor housing 30. This second portion of pressurized gas can be used to create rotational energy to turn the rotor 40 within the housing 30.

Figure 2A:
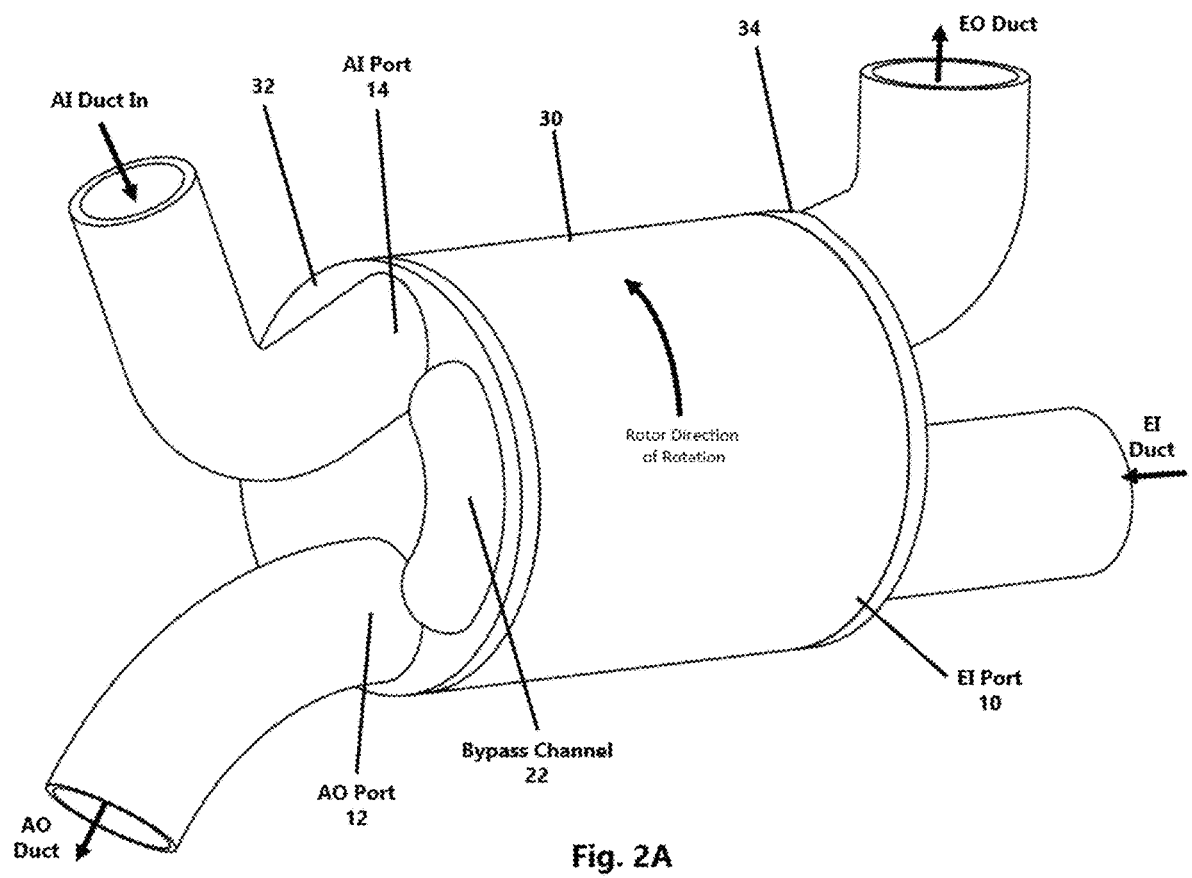
FIG. 2A is a perspective view of an exemplary embodiment of an enhanced pressure wave supercharger of the present invention.
Figure 2B:
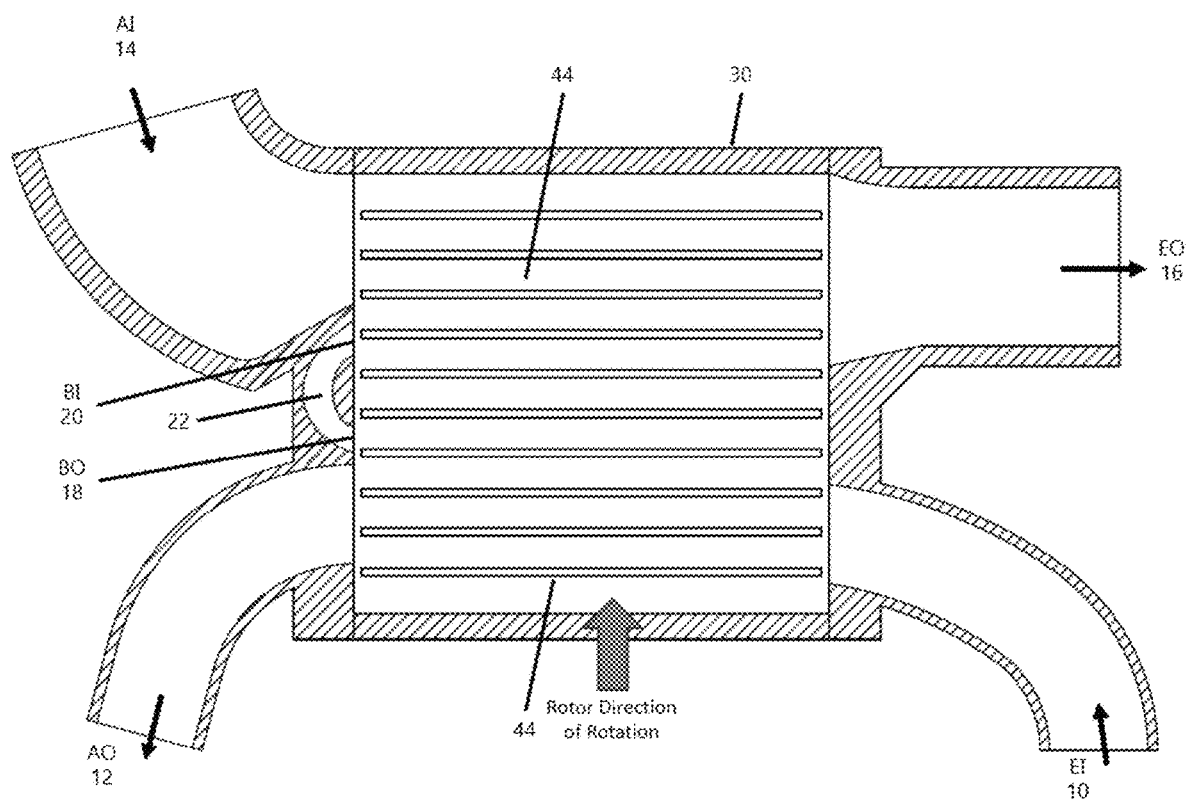
FIG. 2B is cross-section view of an exemplary embodiment of an enhanced pressure wave supercharger of the present invention.

As shown in FIGS. 2A and 2B, the EPWS can have a rotor housing 30 for housing the rotor 40. The rotor can have a plurality of rotor cells or passageways 44. In some embodiments, the rotor 40 can be cylindrical and rotate around a central axis to allow gas pass through the plurality of passageways 44. The present invention can utilize a select final portion of the compressed gas stream, the stream produced by the internal interactions within the wave rotor of the aspirated air with the higher temperature IC engine exhaust stream, to be supplied to a subsequent EI port 10 ahead of, and prior to the introduction of aspirated air from the AI port 14 to be compressed and provided back to the IC combustion chamber through the AO port 12. The ports can be incorporated into end plates 32, 34 attached to the respective sides of the rotor housing 30. It is understood herein that in one embodiment the rotation of the rotor 40 is accomplished by conventional rotational devices within the contemplation of one of ordinary skill in the art. Exhaust gases from an IC engine 41 can be used to rotate the rotor 40. Similarly, a shaft can be coupled to the central axis of the rotor and coupled to a driving means. The driving means can include a belt and pulley that is subsequently driven by a crank or similar drive shaft of an IC engine 41. The wave rotor 40 can be fixedly coupled to a shaft that is rotatable on a pair of bearings (not illustrated). In one form of the present invention the wave rotor 40 rotates about the central axis in the direction of arrow shown in FIGS. 2A and 2B. The plurality of passageways 44 can extend along the length of the rotor 40 parallel to the central axis and can be formed between and inner wall 36 and outer wall 38 of the rotor 40 to separate the flow of gas within the passageways 44.

The pair of end plates 32 and 34 can be coupled adjacent to the rotor 40 to control the passage of gas into and out of the plurality of passageways 44 as the rotor 40 rotates. The end plates 32 and 34 can be sealingly arranged with the rotor housing 41 so as to prevent to maintain the pressure within the apparatus. Additional auxiliary seals (not illustrated) can be included to form increase the sealing efficiency of the apparatus. Any suitable seal can be used to provide the appropriate sealing relationship.

At the closing 10b of the Exhaust Inlet ("EI") port 10, through which a gas stream from an IC engine discharge is admitted into the rotor 40, a pressure reducing or expansion wave 103a, 103b, 103c is produced to bring the entering gas to a rest condition relative to the rotor passage. As the expansion wave 103 reaches the opposite end of the rotor passage 4, the spreading fan nature of the wave 103 causes a gradual drop off in the momentum and energy of the flow as it arrives at the AO port 12 and BO port 18. The BO port 18 captures the majority of the lower momentum flow and the flow is routed to the BI port 20. In some exemplary embodiments, the bypass passage 22 between the BO port 18 and the BI port 20 may optionally include one or more of the following: a turbine or work other extracting device 26, a turning vane 28, and a control valve 24. The three features can be included individually or in any combination thereof proximate to the BO port 18, BI port 20, or both, or disposed within the duct or passage 22 between the BO port 18 and the BI port 20. In some embodiments, the moveable or turning vane 28 and control valve 24 can be combined into one joint feature, wherein the control valve can additionally operate as a turning vane.

The turbine or work other extracting device 26 can act to extract work from Flow Stream B 2. The control valve 24 can restrict and control the amount of flow in Flow Stream B 2. The vane can turn the Flow Stream B 2 as it enters the BI port 20 thus adjusting the angle of the flow approaching the rotor 40 and sets the amount of work transmitted to the rotor 40. In addition to the optional three features previously discussed, a heat exchanger or intercooler 30 can be present between the BO port 18 and BI port 20. The heat exchanger 30 can aid in cooling the flow stream of gas as it passes through the duct or passage 22. The heat exchanger can be optionally present in any combination with the turbine or work other extracting device 26, vane 28, or valve 24 previously mentioned.

Flow Stream B 2 enters the rotor 40 at a pressure and velocity to create a shock 100 such that the expansion wave fan 101a, 101b, 101c emanating from the point of leading edge 16a of the EO port 16 is canceled or partially canceled. This canceling avoids a strong reflection of the expansion wave 101 from being formed and subsequently arriving at the EO port 16. Explaining further, the Flow Stream B 2 entering the BI port 20 is caused to travel at a higher velocity than the aspirated air flowing in AI port 14 and, as such, causes an expansion wave 105 to form within the rotor passage as it arrives at the leading edge 14a of the AI port 14. Flow Stream B 2 in this way does work on the aspirated air stream flow by means of the expansion wave fan 105a, 105b, 105c, and in the form of flow work as they flow together down the rotor passage toward the EO port 16. The position of the trailing edge 16b of the EO port 16 allows a portion of Flow Stream B 2 to exit the rotor 40 and the flow to enter the EO port 16 near the EO port closing section 16b. A shock 106 is formed at the closing of the rotor passage 4 as the closing 16b of EO port 16 is reached. This shock 106 travels upstream within the rotor passage 4 toward the AI port 14 trailing edge 14b. The rotational speed of the rotor 40 is selected such that the arrival of this shock 106 on the AI port 14 end occurs after the rotor passage 4 is closed to the AI port 14. This upstream traveling shock 106 acts to partially compress the aspirated air and traps it within the rotor passage 4.

The trapped air together with a portion of the Flow Stream B 2 then arrives at the leading edge 10a of EI port 10 due to rotation of the rotor. The gas flow delivered from the IC engine 41 exhaust is at a higher pressure and temperature than the trapped aspirated air and the portion of the Flow Stream B 2 thus causing a shock 102 to form at the leading edge 10a of the EI port 10, with the formed shock 102 then traveling into the rotor passage 4. The location of the AO port 12 leading edge 12a is adjacent to the arrival of this shock 102 at the opposing end of the rotor 40. The static pressure within the AO port 12 is, however, selected to be higher than that of the flow following the shock wave 102. Hence a reflected shock 104 is formed traveling in the reverse direction in the rotor passage 4.

This later shock 104 changes speed as the cold to hot interface 107 represented by the dotted line is encountered and the shock 104 arrives at the end of the passage 4 adjacent to the trailing edge 10b of the EI port 10. During this portion of the cycle, the high pressure and hot temperature IC engine exhaust gas transfers energy in the form of compression and flow work to the previously partially compressed aspirated air via the two shock waves 102,104 and the hot gas to cooler gas interaction in the rotor passages. At the trailing edge 10b of the 4 at EI port 10, an expansion wave 103a, 103b, and 103c is formed within the admitted IC engine exhaust gases in the rotor passage 4 due to rotor 40 rotation. This expansion wave 103a, 103b, 103c travels toward the trailing edge 12b of the AO port 12.

The above description covers one repeating cycle of pressure wave processes in the rotor and one cycle of the EPWS internal rotor pressure and flow cycle. A portion of compressed aspirated air also can enter the BO port 18 to replace the portion of Flow Stream B exiting the rotor via EO port 16. Thus the Flow Stream B 2 is continually replenished. Flow Stream B 2 can been seen in FIG. 3, and is represented in between the cold to cold gas interface 109 and the cold to hot gas interface 107. Note that more than one cycle may be completed within a single rotor rotation by placement of a repeating sequence of ports around the circumference of the rotor.

Regarding the use of Flow Stream B 2, work may be extracted from this gas stream 2 and transferred into rotational energy of the rotor 40 through use of a portion of the available momentum of the compressed gas via incidence on the rotor webs. In addition, work extracted from Flow Stream B 2 can be delivered by the optional turbine or work other extracting device 26 and can be made available as a power output in the form of shaft work.

The Flow Stream B 2 extracted as a final portion of the gases compressed by the entering gas at EI port 10 causes the transmission of a portion of the energy and momentum of Flow Stream B 2 compressed gas to the aspirated air by gas to gas contact and pressure wave action inside the rotor passages. These actions then realize an altered and enhanced wave process in the PWS design having a fewer number of end to end wave travels within the rotor passages. The wave travel of previous PWS devices, slow or even cause direction reversals in both incoming and exiting port gas flow, resulting in reduced gas flow in and out of the device for a given unit size. This slowing and or reversal also causes additional viscous losses due to the mixing of gases in these velocity gradients, resulting in higher losses within previous PWS devices. By eliminating and reducing the end to end wave travels found in previous PWS devices, the enhanced wave-rotor supercharger-created wave cycle is able to deliver a higher level of work exchange between the IC engine exhaust and the aspirated air, which can be compressed to a higher level and delivered to the IC engine inlet 45 and deliver into the combustion chamber 47 the desired supercharging effect.

INDUSTRIAL APPLICABILITY

The present invention causes the incoming aspirated air to be compressed to a higher pressure more efficiently, thereby resulting in a lower final temperature than in a conventional PWS. The resulting lower temperatures can allow for greater IC engine supercharging to produce higher efficiency and greater power in the IC engine. The need to provide intercooling is reduced by use of a more efficient compression process. The present invention can allow for the PWS unit size to be smaller and more compact than a conventional PWS. The reduction of size enabled by the present invention allows for lower weight and improved packaging of the unit, which can provide for greater efficiency for vehicles and reduces the engine compartment space needed to house a supercharger of the present invention. The need of loss-producing, wave canceling cavities or pockets within the walls of the wave rotor stationary parts such as is used in the conventional PWS is reduced or eliminated. This invention causes the temperature of the rotor to be lower than in a conventional PWS, allowing lower thermal distortion of the rotor that may harm the ability to provide air flow seals. Additionally, lower cost rotor materials may be used due to the lower heat requirements of the EPWS.

This invention causes the exhaust gases to exit at a higher residual pressure than in a conventional PWS, allowing size and cost reductions in the downstream exhaust system as well as diminish adverse effects on the unit operation due to any exhaust system backpressure. This invention reduces the level of required backpressure in the high temperature gas stream supplied by the IC engine for a given compression of the aspirated air, thus allowing greater shaft power production within the IC engine.

Furthermore, the present invention can have additional components as shown in FIG. 4. The enhanced supercharger of the present invention can also include an optional secondary intercooler 48 to further cool the air prior to reaching the IC engine combustions chamber 47. Similarly, any converters, such as a catalytic converter 46, can be used to treat exhaust gas traveling from the engine to the EI port 10, or from the EO port 16 to the remaining of the exhaust system or out to the external environment. Various throttle bodies can be located in various passages of the engine supercharging system to control the flow of the air throughout the system. In one exemplary embodiment, a throttle body 42 can be located prior to the AI port 14. Additionally or separately a throttle body 42b can be located in the passage between the AO port 12 and the engine inlet valve 45 of the supercharging system. The combustion engine 41 may use any suitable type of spark ignition shown, or diesel type, or wankle, or other positive displacement combustion engine types. An electronic control unit ("ECU") 41 can be communicatively coupled to the supercharger as well as other components of the supercharger system, such as the various throttle bodies 42, bypass valve 24, and the bypass vane 28. The ECU can use variable offset to optimize and control various components of the supercharger and the superchargers system.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An enhanced pressure-wave supercharger for a combustion engine, comprising:
   at least one housing assembly comprising a first portion and a second portion, wherein said first portion is configured to generate pressurized gas to be supplied to said engine;
   a plurality of channels, wherein a first channel is configured to direct exhaust gas from the combustion engine towards said housing, a second channel is configured to draw in air from an external environment, a third channel configured to direct and discharge the exhaust gas from said housing, a fourth channel configured to supply a first portion of pressurized gas from the housing to the combustion engine, and a fifth channel, located after the fourth channel and before the second channel, with respect to direction of rotation, wherein the fifth channel is configured to direct pressurized gas from said housing back into said housing to generate rotational energy to at least one rotor disposed within said housing, wherein said fifth channel comprises a work extracting device, a bypass inlet and a bypass outlet passage, wherein said bypass inlet is configured to direct a second portion of pressurized gas from inside said first portion of the housing back into said second portion of the housing through the bypass outlet passage.

2. The supercharger of claim 1, wherein said second portion is configured to create rotational energy to turn said rotor and increased pressure of the first portion of pressurized gas.

3. The supercharger of claim 1, wherein the work extracting device is a turbine.

4. The supercharger of claim 1, wherein said fifth channel further comprises a control valve disposed within said fifth channel and configured to control the flow of gas through the fifth channel.

5. The supercharger of claim 1, wherein said fifth channel further-comprises a control valve and a turning vane.

6. The supercharger of claim 3, wherein said fifth channel further comprises a moveable vane.

7. The supercharger of claim 6, wherein said fifth channel further comprises a control valve.

8. The supercharger of claim 1, wherein said fifth channel further comprises an integrated control valve and a movable vane.

9. The supercharger of claim 8, wherein said fifth channel further comprises a turbine.

10. The supercharger of claim 3, wherein said fifth channel further comprises a turning vane and a control valve, wherein said turbine is configured to extract work from said second portion of pressurized gas, and wherein said control valve restricts and controls the amount of flow of the second portion of pressurized gas, and wherein said vane turns the second portion of pressurized gas as it enters the bypass inlet passage thus adjusting the angle of the flow approaching the rotor and sets the amount of work transmitted to the rotor.

11. The supercharger of claim 1, wherein said rotor has a plurality of passageways therethrough for gas flow.

12. The supercharger of claim 1, wherein said housing assembly is comprised of a hot gas subassembly and a cold gas subassembly.

13. The supercharger of claim 1, further comprising a control valve disposed prior to the first channel, wherein the control valve is configured to regulate the flow of exhaust gas from the engine into the housing assembly.

14. The supercharger of claim 1, wherein said fifth channel further comprises a heat exchanger.

15. An enhanced pressure-wave supercharger for a combustion engine, comprising:
   at least one housing assembly, comprising:
      a first portion and a second portion, wherein said first portion is configured to generate pressurized gas to be supplied to said engine;
   a plurality of channels configured to direct gas towards and from said housing, comprising:
      a first channel configured to supply exhaust gas from the combustion engine;
      a second channel configured to draw in air from an external environment;
      a third channel configured to discharge exhaust gas from the supercharger;
      a fourth channel configured to supply a first portion of pressurized gas from the supercharger to the combustion engine;
      a fifth channel having a work extracting device, a bypass inlet and a bypass outlet passage, wherein said bypass inlet is configured to direct a second portion of pressurized gas from inside said first portion of the housing back into said second portion of the housing through the bypass outlet passage; and
   at least one rotor disposed within said housing, wherein said second portion of pressurized gas is configured to increase rotational energy to turn said rotor.

16. The supercharger of claim 15, wherein said work extracting device is a turbine, and said fifth channel further comprises a turning vane and a control valve, wherein said turbine is configured to extract work from said second portion of pressurized gas, and wherein said control valve restricts and controls the amount of flow of the second portion of pressurized gas, and wherein said vane turns the second portion of pressurized gas as it enters the bypass inlet passage thus adjusting the angle of the flow approaching the rotor and sets the amount of work transmitted to the rotor.

17. A method of efficiently driving a pressure wave supercharger comprising:
   providing a pressure wave rotor assembly having a rotatable rotor within a housing and a plurality of passageways for the passage of gas therethrough;
   compressing air with an enhanced pressure wave supercharger, wherein an exhaust gas channel connects a combustion engine to the pressure-wave supercharger, wherein exhaust gas from the combustion engine is used to power the pressure-wave supercharger, an outlet channel is connected from the pressure-wave supercharger to the engine, an air inlet channel connected to the pressure-wave supercharger, and outlet channel connected to an exhaust system to the pressure wave supercharger, a bypass channel connected to two portions of the enhanced pressure wave supercharger wherein said bypass channel includes a work extracting device, and a gas inflow valve for increasing and decreasing gas flow through the exhaust gas channel; and
   creating a compression flow stream and using the bypass channel to more efficiently drive said supercharger, wherein said bypass channel is configured to direct pressurized gas from inside a first portion of the housing back into a second portion of the housing through a bypass outlet passage; and increases rotational energy to turn said rotor and increase pressure of gas travelling through the outlet channel.

* * * * *